United States Patent Office 3,361,827
Patented Jan. 2, 1968

3,361,827
PREPARATION OF BENZALACETOPHENONE
Harry A. Biletch, Lexington, and Joseph V. Rajunas, Jr., Framingham, Mass., assignors, by mesne assignments, to American Plastic & Chemical Corporation, Newton, Mass., a corporation of Delaware
No Drawing. Filed Jan. 5, 1965, Ser. No. 423,591
5 Claims. (Cl. 260—590)

ABSTRACT OF THE DISCLOSURE

A process for the formation of benzalacetophenone directly in purified bead form in less time than prior art processes comprising the condensation of benzaldehyde with acetophenone in a water-alcohol mixture using a relatively high alkali concentration.

---

This invention relates to benzalacetophenone, commonly known as chalcone, and has for its principal object provision of an improved method of preparation.

Chalcone as herein contemplated is prepared by condensing benzaldehyde with acetophenone. In order to obtain good yield care must be taken to avoid the competitive Cannizaro reaction by which the benzaldehyde would be converted to benzoic acid and benzyl alcohol. It is believed that the best prior condensation procedure is disclosed in Organic Syntheses, vol. 1, p. 78, 2nd ed. by Gilman and Blatt, John Wiley and Sons, Inc. An equimolar condensation is there suggested with good yield in a water-ethyl alcohol mixture in a mol ratio of 5.4:1, the concentration of reactants contained being about 24% by total weight. Alkali (NaOH) was used as catalyst, about 5.4% by weight and the condensation conducted at 15–30° C. for about 3 hours, followed by ten additional hours at 0° C. This procedure results in a finely divided product difficult to purify and isolate and involves long reaction and coagulation times at low temperatures undesirable for commercial use. Purification is suggested by recrystallization in ethanol.

In accordance with this invention it has been found that chalcone can be prepared directly in purified bead form in about five hours or less and without requiring recrystallization. This is accomplished by increasing the reactant and alkali concentrations, by reducing the water/alcohol mol ratio, and by a simplified recovery and purification procedure. Unexpectedly, there is no significant loss in yield despite the fact that the Cannizaro reaction is promoted by increased reactant and alkali concentrations.

According to the present invention, the water/alcohol mol ratio should be between about 2.7:1 and 4.5:1; the concentration of reactants combined between about 35 and 70% by total weight of reaction mixture and preferably about 50%; and the alkali concentration between about 8 and 18% by total weight, preferably about 13%. The temperature should be maintained below about 30° C. and above about 0° C., and more preferably between about 18 and 23° C. Substantially any lower alkyl alcohol or glycol which is water miscible can be used but the shorter monoalcohols are preferred and methanol most preferred. Examples in addition to methanol include ethanol, isopropanol, butanol and ethylene glycol. Sodium or potassium hydroxide are preferred as the alkali, but other alkali metal or alkaline earth metal hydroxides soluble in the amounts stated, can be used if desired.

The product forms as a precipitate rather than a colloidal suspension, and can conveniently be purified as follows. The supernatant water/alcohol/alkali liquid is separated, fresh non-solvent, preferably water, added, the product melted and vigorously agitated to form liquid suspended droplets of the desired size, and the mixture quenched to freeze the droplets as by addition of ice, cold water or any other suitable means. Beads of relatively pure product are formed which can be separated by filtration and washed with water and cold methanol or other alcohol. Single washings are usually sufficient.

The preferred procedure in accordance with this invention is given below,

Example

| | | |
|---|---|---|
| Benzaldehyde | mol | 1 |
| Acetophenone | do | 1 |
| NaOH | moles | 1.28 |
| $H_2O$ | do | 4 |
| $CH_3OH$ | do | 1.5 |

The NaOH is dissolved in the water, the resulting solution cooled to 15° C., and the $CH_3OH$ added. Stirring is commenced and the reactants added, first the acetophenone and then the benzaldehyde. The temperature rapidly rises to 20° C. and then more slowly to 23° C. at which it remains. In about 3 hours, a seed crystal of chalcone is added and the reaction continued for another hour. The product is formed as an oily solid precipitate.

The reaction medium (NaOH—$CH_3OH$—$H_2O$) is then decanted, sufficient water then added to cover the stirrer, about 250 ml., and the resulting chalcone suspension heated to 60° C. During heating, 3N.HCl is added to neutralize remaining NaOH and maintain the pH at about 6.5 to 7.0. At 60° C. the chalcone is melted and heating is discontinued. With continued stirring, the temperature is rapidly reduced to 40° C. by addition to the suspension of ice or cold water causing the chalcone to solidify as small beads. The suspension is then cooled externally to 20° C., the beads filtered, washed with water followed by a small amount of cold $CH_3OH$ and oven dried. Yield 90%, M.P. 55–57° C.

In the above procedure, any convenient water-soluble acid non-reactive with chalcone, preferably a mineral acid, can be substituted for the HCl. Also the seed crystal of chalcone can be omitted if desired, although its use aids in precipitate formation.

It is to be noted that the above procedure provides the desired product in about four hours, rather than the twelve to twenty-four hours heretofore required, the product is obtained in the convenient form of beads rather than a colloidal solid, and that undesired side reactions, such as the Cannizaro, are substantially avoided. Further, the resulting product is of better purity than the product of prior procedures.

Chalcone provided in accordance with this invention can be used for various known purposes, for example, in perfumery or as an intermediate, for example in dye synthesis.

It should be understood that the foregoing description is for the purpose of illustration and that the invention includes all modifications falling within the scope of the appended claims.

We claim:
1. In the method of preparing chalcone by condensation of benzaldehyde and acetophenone below about 30° C. in a water-miscible alcohol/water/alkali medium, the improvement comprising
   (a) providing a water/alcohol mol ratio between 2.6:1 and 4.5:1,
   (b) providing an alkali concentration between 8 to 18% based on total reaction mixture weight, and
   (c) providing a reactant concentration of benzaldehyde and acetophenone between 35 and 70% by total weight.
2. The method according to claim 1 wherein said alcohol is methanol.

3. The method according to claim 2 wherein said water/alcohol ratio is about 2.7:1, said alkali is about 13% of the total weight, and said reactant concentration is about 50% by weight.

4. The method according to claim 1 further comprising the steps of
   (d) separating the precipitated chalcone,
   (e) suspending the chalcone in a liquid non-solvent,
   (f) neutralizing,
   (g) melting the chalcone,
   (h) quenching the melted chalcone while agitating to form beads, and
   (i) recovering the beads.

5. The method of preparing chalcone which comprises providing the following reaction mixture in about the following proportions:

| | Mols |
|---|---|
| Methanol | 1.5 |
| Water-methanol | 4.0 |
| NaOH | 1.3 |
| Benzaldehyde | 1 |
| Acetophenone | 1 | reacting the mixture at about 15 to 27° C. for 3 to 6 hours, adding a seed crystal of chalcone, decanting, adding water, neutralizing to a pH of 6.5 to 7.0, melting the chalcone and freezing it while agitating to form beads, and recovering the beads.

References Cited
UNITED STATES PATENTS

| 2,496,697 | 2/1950 | Chapin | 260—590 |
| 2,647,148 | 6/1953 | Martin et al. | 260—590 |

OTHER REFERENCES

Gilman et al., Organic Synthesis. Collective volume 1, second edition, pp. 78–80 (1941), John Wiley and Sons, Inc., New York, N.Y.

DANIEL D. HORWITZ, *Primary Examiner.*